(No Model.)
J. MUSGROVE.
COVER FASTENING FOR CANS, PAILS, &c.
No. 535,457. Patented Mar. 12, 1895.
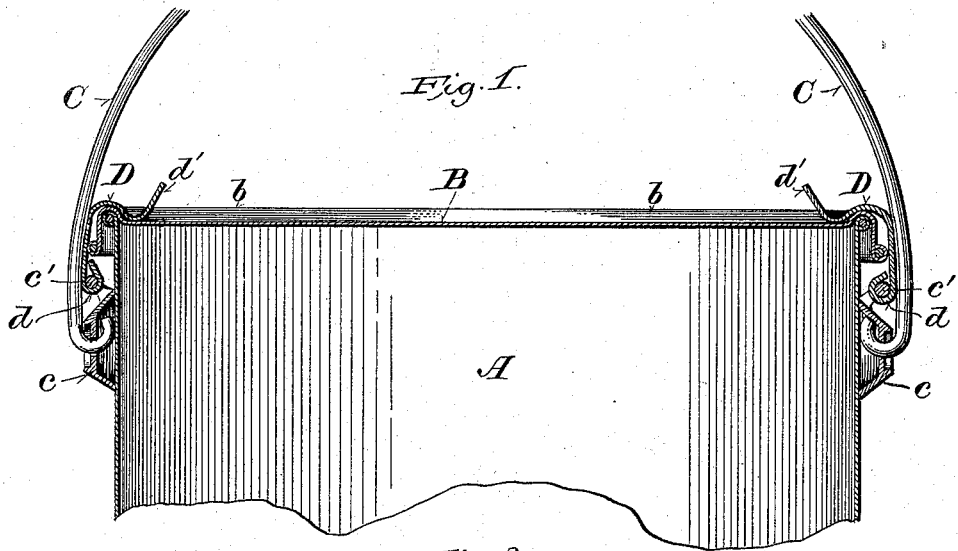
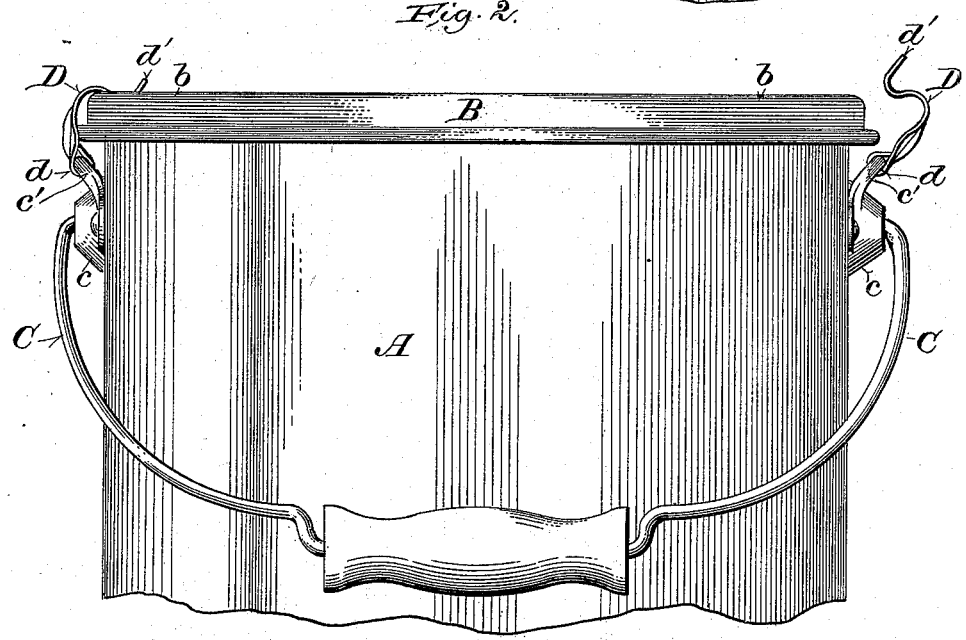
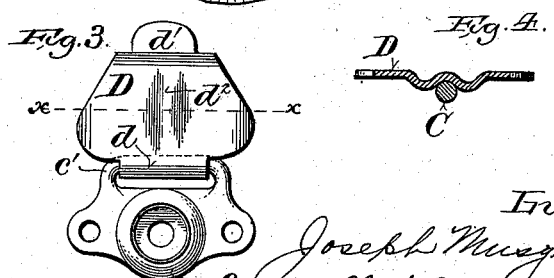
Witnesses:
Inventor:
Joseph Musgrove
By his Attorneys

UNITED STATES PATENT OFFICE.

JOSEPH MUSGROVE, OF MILWAUKEE, WISCONSIN, ASSIGNOR TO THE GEUDER & PAESCHKE MANUFACTURING COMPANY, OF SAME PLACE.

COVER-FASTENING FOR CANS, PAILS, &c.

SPECIFICATION forming part of Letters Patent No. 535,457, dated March 12, 1895.

Application filed April 11, 1892. Serial No. 428,719. (No model.)

*To all whom it may concern:*

Be it known that I, JOSEPH MUSGROVE, of Milwaukee, in the county of Milwaukee and State of Wisconsin, have invented certain new and useful Improvements in Cover-Fastenings for Cans, Pails, &c.; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of my invention is to hold the lids or covers of cans, pails and other similar utensils in place independently of their bails, and to cause the bail when raised, to automatically close the fastenings, but when turned down, to leave them locked.

It consists essentially of clasps hinged or pivoted to the sides of the can or pail adjacent to the bail ears and adapted to be sprung over the edges of the cover or lid, and of certain other peculiarities of construction and arrangement hereinafter particularly described and pointed out in the claims.

In the accompanying drawings like letters designate the same parts in the several figures.

Figure 1 is a vertical section of a portion of a can or pail and its cover to which my improved fastenings are applied. Fig. 2 is an elevation of the same; Fig. 3, a detached view in side elevation of one of the bail ears and clasps hinged thereto, and Fig. 4 is a horizontal section of the clasp and bail on the line $x$—$x$ Fig. 3.

A represents the upper portion of a can or pail; B, the lid or cover which has a groove impressed in its under side around the edge to fit over the upper edge of the can or pail. An annular rib $b$, is thus formed on the upper side of the cover around its edge.

C represents the bail, made of heavy wire and formed in the usual manner at the ends with hooks which are pivoted in the usual or any suitable form of ears $c$ $c$, attached to the outside of the can or pail near the top.

D D are clasps which may be conveniently stamped out of sheet metal in the form of hooks adapted to be sprung over the rib $b$, at the edge of the cover. They are turned at their bases into sleeves $d$ $d$, around loops $c'$ $c'$ provided for the purpose on the bail ears $c$ $c$. At their free ends they are formed with thumb pieces $d'$ $d'$, by which their disengagement from the lid or cover B may be easily effected. In the outer faces of the clasps D, I form a vertical depression $d^2$, as shown in Figs. 3 and 4, into which the bail $c$ is sprung when it is raised, thereby locking the clasps over the cover and holding the bail in an upright position. The clasps D are so constructed and arranged that when the bail is raised it will automatically close them over the lid or cover, as shown in Fig. 1, but the lowering of the bail will not unlock or disengage said clasps, it being necessary to unclasp them from the cover manually before the cover can be removed.

Although I prefer to construct the clasps in connection with the bail ears to which they are hinged as herein shown and described, they may be variously modified as to form and the mode of hinging or pivoting them to the can or pail within the intended scope of my invention, and they may be made of wire or other suitable material besides sheet metal.

I claim—

1. The combination with a can or pail provided with a bail pivoted thereto on opposite sides, and with a removable cover, of hook-shaped clasps hinged to the can or pail adjacent to the bail connections transversely to the axis on which the bail turns, said clasps when turned outwardly projecting into the path of the bail, whereby the elevation of the bail is caused to close them over the cover, substantially as and for the purposes set forth.

2. The combination with a can or pail provided with a bail hinged or pivoted thereto and with a cover, of clasps hinged or pivoted to the outside of said can or pail near the top and arranged to be hooked over the edges of the cover and hold the same in place, said clasps being formed in their outer sides with seats into which the bail is sprung when it is raised into a vertical position, thereby locking said clasps and the cover in place and holding the bail in an upright position, substantially as and for the purposes set forth.

3. The combination with a can or pail provided with a removable cover having an annular groove on the under side fitting over the rim of the pail, and a corresponding marginal rib on the upper side, of perforated bail ears attached to opposite sides of the can or pail and provided with ribs transverse to the axis on which the bail turns, a bail bent at the ends and pivoted in the perforations of said ears, and angular clasps hinged upon the loops of said ears and adapted to be turned thereon transversely to the movement of the bail into and out of engagement with the marginal rib on the cover, said clasps when turned outwardly projecting into the path of the bail, whereby they are automatically turned into engagement with the cover by the elevation of the bail, substantially as and for the purposes set forth.

4. The combination with a can or pail provided with a removable cover and a bail, of hook-shaped clasps hinged to the outside of said can or pail above and adjacent to the bail connections and having seats formed in their outer faces into which the bail is sprung when raised, thereby locking the cover in place and holding the bail in an upright position, substantially as and for the purposes set forth.

5. The combination with a can or pail provided with a removable cover having an annular groove on the under side and a corresponding rib on the upper side around its edge, and with bail ears attached to the outside near the top and formed or provided with loops, of hook-shaped clasps bent around said loops and formed at their free ends with thumb pieces and in their outer faces with seats into which the bail is sprung when raised, thereby locking said clasps over the cover and holding the bail in an upright position, said clasps being constructed and arranged to be automatically closed over the cover by raising the bail, substantially as and for the purposes set forth.

In testimony that I claim the foregoing as my own I affix my signature in presence of two witnesses.

JOSEPH MUSGROVE.

Witnesses:
CHAS. L. GOSS,
WILLIAM GEUDER.